United States Patent
Chuang et al.

(10) Patent No.: US 8,644,039 B2
(45) Date of Patent: Feb. 4, 2014

(54) VOLTAGE MULTIPLYING CIRCUIT UTILIZING NO VOLTAGE STABLING CAPACITORS

(75) Inventors: Chen-Jung Chuang, Taipei County (TW); Chien-Kuo Wang, Hsinchu (TW)

(73) Assignee: ILI Technology Corp., Jhubei, Hsinchu County (TW)

( * ) Notice: Subject to any disclaimer, the term of this patent is extended or adjusted under 35 U.S.C. 154(b) by 571 days.

(21) Appl. No.: 12/832,999

(22) Filed: Jul. 9, 2010

(65) Prior Publication Data

US 2011/0304221 A1      Dec. 15, 2011

(30) Foreign Application Priority Data

Jun. 9, 2010  (TW) ................................ 99118795 A

(51) Int. Cl.
*H02M 3/18*    (2006.01)
*H02J 7/00*    (2006.01)
*G05F 1/00*    (2006.01)

(52) U.S. Cl.
USPC ............. 363/60; 307/110; 320/166; 323/288; 363/59

(58) Field of Classification Search
USPC ............... 363/59, 60; 307/109, 110; 323/288; 320/166
See application file for complete search history.

(56) References Cited

U.S. PATENT DOCUMENTS

| | | | | |
|---|---|---|---|---|
| 4,807,104 A | * | 2/1989 | Floyd et al. | 363/59 |
| 5,051,881 A | * | 9/1991 | Herold | 363/60 |
| 5,159,543 A | * | 10/1992 | Yamawaki | 363/60 |
| 5,187,421 A | * | 2/1993 | Naito | 363/59 |
| 7,279,957 B2 | * | 10/2007 | Yen | 327/536 |
| 2007/0091655 A1 | * | 4/2007 | Oyama et al. | 363/59 |
| 2008/0013349 A1 | * | 1/2008 | Yanagida et al. | 363/60 |

FOREIGN PATENT DOCUMENTS

TW          200620795         6/2006

* cited by examiner

*Primary Examiner* — Adolf Berhane
*Assistant Examiner* — Gary Nash
(74) *Attorney, Agent, or Firm* — Winston Hsu; Scott Margo

(57) ABSTRACT

A voltage multiplying circuit comprising: a first capacitor, comprising a first terminal and a second terminal, wherein the first terminal of the first capacitor is selectively coupled to a first voltage or a second voltage, and the second terminal is selectively coupled to the first voltage or a fourth voltage; a second capacitor, comprising a first terminal and a second terminal, wherein the first terminal of the second capacitor is selectively coupled to the second voltage or the fourth voltage, and the second terminal of the second capacitor is selectively coupled to a third voltage or the fourth voltage; and a third capacitor, comprising a first terminal and a second terminal, wherein the first terminal of the third capacitor is selectively coupled to the second voltage or the fourth voltage, and the second terminal of the third capacitor is selectively coupled to a third voltage or the fourth voltage.

18 Claims, 5 Drawing Sheets

Φ1

VOLTAGE MULTIPLYING CIRCUIT UTILIZING NO VOLTAGE STABLING CAPACITORS

BACKGROUND OF THE INVENTION

1. Field of the Invention

The present invention relates to a voltage multiplying circuit, and particularly relates to a voltage multiplying circuit that can save the number of capacitors.

2. Description of the Prior Art

In many electronic apparatuses, a voltage multiplying circuit is always utilized to generate a desired voltage. Please note that the voltage multiplying circuit is not limited to a double voltage multiplying circuit. It can also mean a triplicity voltage multiplying circuit, a quadruple voltage multiplying circuit or a voltage multiplying circuit with a higher multiple. A charge pump type voltage increasing circuit is a popular voltage multiplying circuit. FIG. 1 illustrates a prior art voltage multiplying circuit. As shown in FIG. 1, the voltage multiplying circuit includes four transistors 101, 103, 105 and 107, which are selectively coupled a voltage VCI, a voltage VCDD, a voltage AVEE and a ground voltage level GND via the switch elements 107-121. Conventionally, the voltage AVDD equals twice of the voltage VCI, and the voltage AVEE equals minus twice of the voltage VCI.

The capacitors 103 and 107 are utilized for voltage stabling capacitors, thus the voltages thereon are fixed. However, the voltages of the capacitors 101 and 105 float instead of fixed. The voltage multiplying circuit disclosed in FIG. 1 includes two phases (the first phase Φ1 and the second phase Φ2, or called the first mode and the second mode). In the first phase Φ1, the switch elements 108, 109 are conductive, thus the voltage VCI charges the capacitor 101. Besides, the switch elements 115, 117 are also conductive, thus the voltage AVDD charges the capacitor 105. In this case, the voltage on the capacitor approaches twice VCI and the voltage on the capacitor 101 approaches VCI. In the second phase Φ2, the switch elements 111, 113 are conductive. In this case, the capacitor 101 can be regarded as a battery, thus the capacitor 101 is series-connected with the voltage VCI to generate a voltage 2VCI. Additionally, the switch devices 119, 121 are also conductive. In this case, the capacitor 105 can be regarded as a battery, thus the capacitor 105 is parallel-connected with the voltage AVEE to generate a voltage −2*VCI.

Via thus structure, a desired voltage can be acquired. However, since a voltage stabling capacitor is utilized, this kind of circuit needs more capacitors, such that manufacturing cost and design complexity increases.

SUMMARY OF THE INVENTION

Accordingly, one objective of the present invention is to provide a voltage multiplying circuit that can save the capacitor number.

One embodiment of the present invention discloses a voltage multiplying circuit comprising: a first capacitor, comprising a first terminal and a second terminal, wherein the first terminal of the first capacitor is selectively coupled to a first voltage or a second voltage, and the second terminal of the first capacitor is selectively coupled to the first voltage or a fourth voltage; a second capacitor, comprising a first terminal and a second terminal, wherein the first terminal of the second capacitor is selectively coupled to the second voltage or the fourth voltage, and the second terminal of the second capacitor is selectively coupled to a third voltage or the fourth voltage; and a third capacitor, comprising a first terminal and a second terminal, wherein the first terminal of the third capacitor is selectively coupled to the second voltage or the fourth voltage, and the second terminal of the third capacitor is selectively coupled to a third voltage or the fourth voltage.

According to above-mentioned embodiments, since the voltage stabling capacitor is omitted, a voltage multiplying circuit can be composed via only three capacitors, to decrease cost and design complexity.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
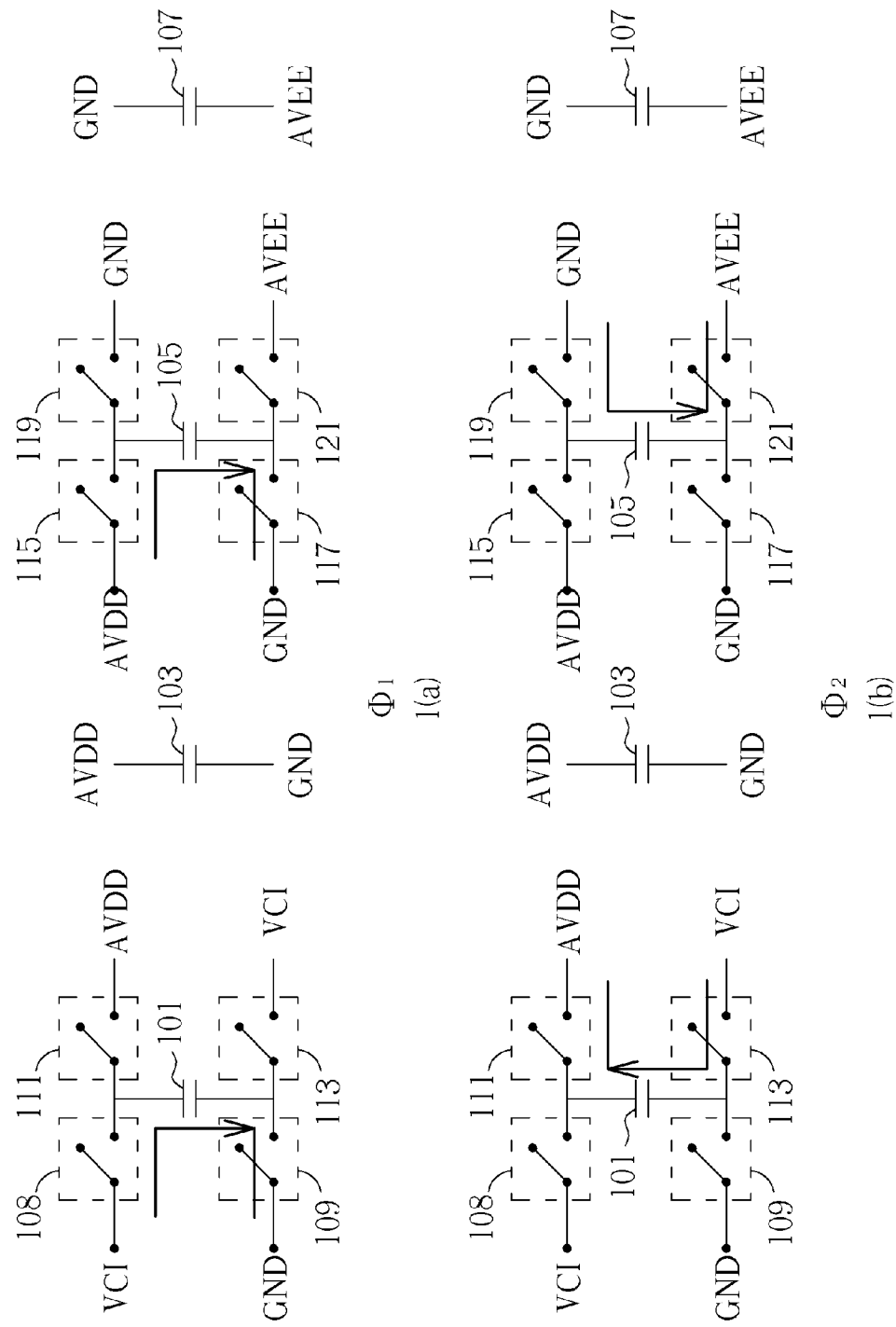
FIG. 1 illustrates a prior art voltage multiplying circuit.
Figure 2:
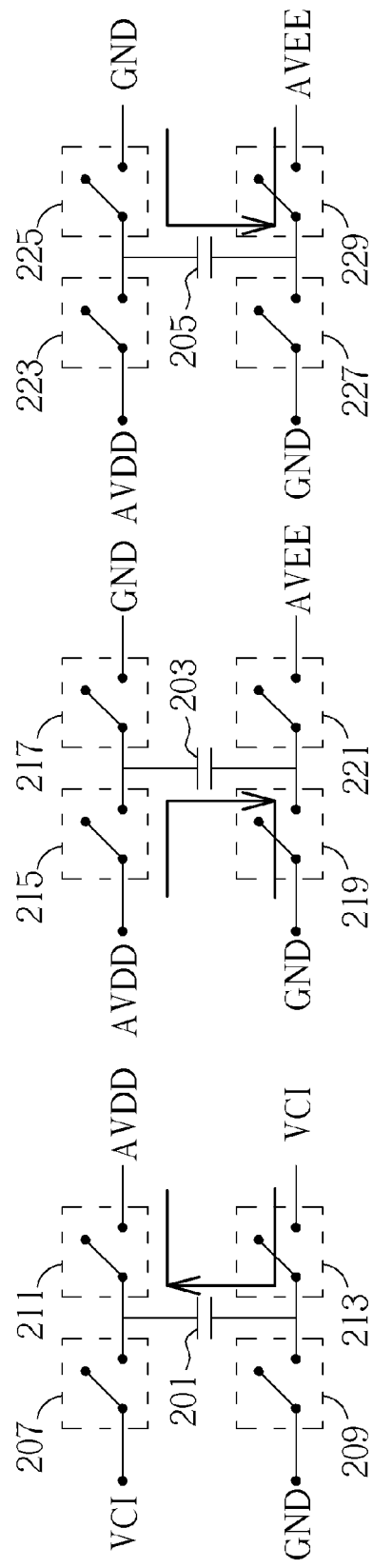
FIGS. 2-5 illustrate the operation for the voltage multiplying circuit according to embodiments of the present application, in different modes.

FIGS. 2-5 illustrate the operation for the voltage multiplying circuit according to embodiments of the present application, in different modes. As shown in FIG. 2, the voltage multiplying circuit according to one embodiment of the present application includes three capacitors 201, 203 and 205, and switch elements 207-229. The capacitor 201 is selectively coupled to the voltage AVDD, the voltage VCI and the ground voltage level GND via switch elements 207-213. The capacitor 203 is selectively coupled to the voltage AVDD, the voltage AVEE and the ground voltage level GND via the switch elements 215, 217, 219 and 221. Besides, the capacitor 205 is selectively coupled to the voltage AVDD, the voltage AVEE and the ground voltage level GND via the switches 223, 225, 227 and 229. The voltage AVDD is a positive integer multiple of the voltage VCI, and the voltage AVEE can be a negative integer multiple of the voltage VCI. In this embodiment, the voltage AVDD is twice of the voltage VCI, but the voltage AVEE is negative twice of the voltage VCI, but it does not mean to limit the scope of the present application.

Figure 3:
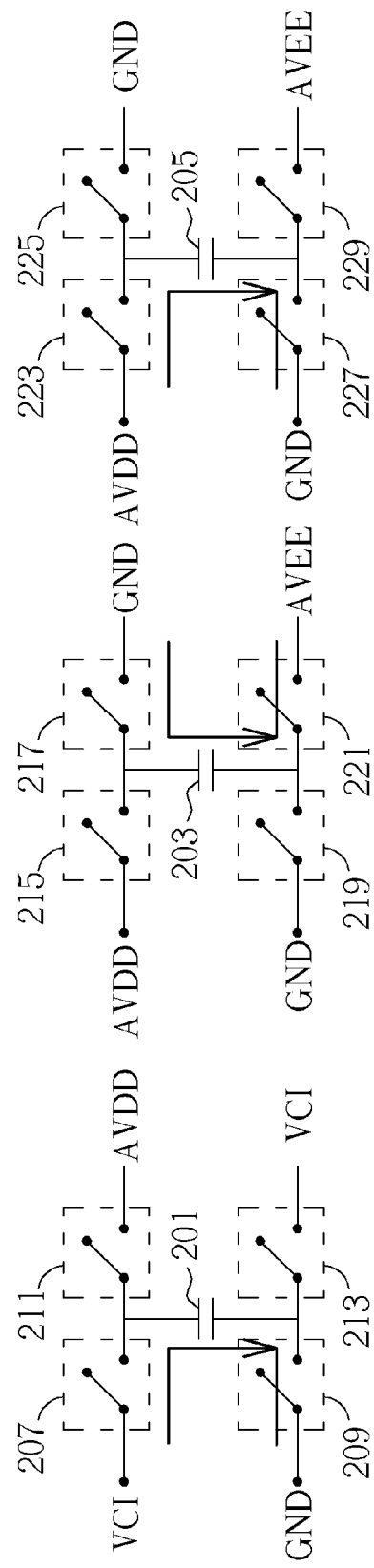
Figure 4:
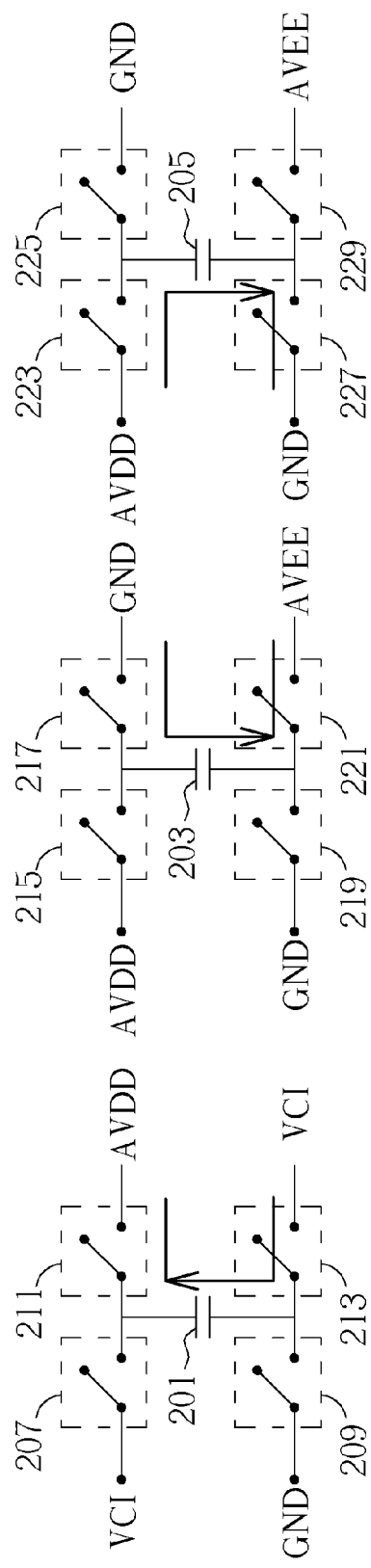
Figure 5:
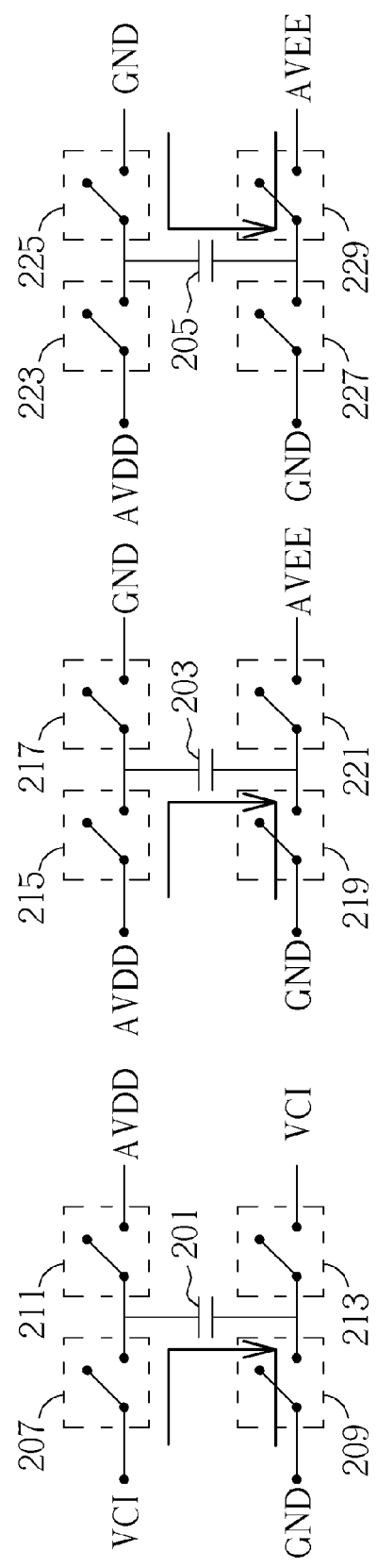

The voltage multiplying circuit can include four types (or called four phases). FIG. 2 illustrates the first mode Φ1, FIG. 3 illustrates the second mode Φ2, FIG. 4 illustrates the third mode Φ3, and FIG. 5 illustrates the fourth mode Φ4. The first mode is also called a power storing mode. In the first mode Φ1, the switch element 211, the capacitor 201 and the switch element 213 form a conductive path; the switch element 215, the capacitor 201 and the switch element 213 form a conductive path; and the switch element 225, the capacitor 205 and the switch element 229 also form a conductive path. In this mode, the capacitor 201 is already charged in the previous mode, thus it can be regarded that a battery is series-connected to the voltage VCI to form a voltage 2VCI. Additionally, the capacitors 203 and 205 are also charged in this mode.

In the second mode Φ2, the switch element 207, the capacitor 201 and the switch element 209 form a conductive path; the switch element 217, the capacitor 203 and the switch element 221 form a conductive path; and the switch element 223, the capacitor 205 and the switch element 227 also form a conductive path. In this mode, the capacitor 201 is charged. The capacitors 203 and 205 can be regarded as a battery, and are parallel-coupled to the voltage AVEE or the voltage AVDD to provide a voltage.

In the third mode Φ3, the switch element 211, the capacitor 201 and the switch element 213 form a conductive path; the switch element 217, the capacitor 203 and the switch element 221 form a conductive path; and the switch element 223, the capacitor 205 and the switch element 227 also form a conductive path. The capacitor 201 has already been charged in the second mode Φ2, thus can be regarded as a battery that is series-coupled to the voltage VCI to form a voltage 2VCI. Besides, the capacitors 203 and 205 keep the same statuses as which in the second mode Φ2.

The fourth mode Φ4 is also called a power supplying mode. In the fourth mode Φ4, the switch element 207, the capacitor 201 and the switch element 209 form a conductive path; the switch element 215, the capacitor 203 and the switch element 219 form a conductive path; and the switch element 225, the capacitor 205 and the switch element 229 also form a conductive path. In this mode, the capacitors 201 and 203 are charged. The capacitor 205 has already been charged in the third mode Φ3, thus can be regarded as a battery parallel-coupled with the voltage AVEE and provides a negative twice voltage. In one embodiment, the modes include a sequence first, second, third and then fourth, but it does not mean to limit the scope of the present application. As above-mentioned, the capacitors 201, 203 and 205 can have different voltage in different situations, thus different connection points can be selectively coupled to a loading to provide necessary voltage.

According to above-mentioned embodiments, since the voltage stabling capacitor is omitted, a voltage multiplying circuit can be composed via only three capacitors, to decrease cost and design complexity.

Those skilled in the art will readily observe that numerous modifications and alterations of the device and method may be made while retaining the teachings of the invention.

What is claimed is:

1. A voltage multiplying circuit, comprising:
    a first capacitor, comprising a first terminal and a second terminal, wherein the first terminal of the first capacitor is selectively coupled to a first voltage or a second voltage, and the second terminal of the first capacitor is selectively coupled to the first voltage or a fourth voltage, wherein the second voltage is from a first constant voltage source permanently providing the second voltage;
    a second capacitor, comprising a first terminal and a second terminal, wherein the first terminal of the second capacitor is selectively coupled to the second voltage or the fourth voltage, and the second terminal of the second capacitor is selectively coupled to a third voltage or the fourth voltage, wherein the third voltage is from a second constant voltage source permanently providing third voltage; and
    a third capacitor, comprising a first terminal and a second terminal, wherein the first terminal of the third capacitor is selectively coupled to the second voltage or the fourth voltage, and the second terminal of the third capacitor is selectively coupled to a third voltage or the fourth voltage, wherein the first terminal of the third capacitor is coupled to the fourth voltage and the second terminal of the third capacitor is coupled to the third voltage in one mode, where the first terminal of the third capacitor is coupled to the second voltage and the second terminal of the third capacitor is coupled to the fourth voltage in another mode.

2. The voltage multiplying circuit of claim 1, wherein the first voltage, the first capacitor and the second voltage form a conductive path; the second voltage, the second capacitor and the fourth voltage form a conductive path; and the fourth voltage, the third capacitor and the third voltage form a conductive path, in a first mode.

3. The voltage multiplying circuit of claim 2, wherein the first voltage, the first capacitor and the fourth voltage form a conductive path; the fourth voltage, the second capacitor and the third voltage form a conductive path; and the second voltage, the third capacitor and the fourth voltage form a conductive path, in a second mode.

4. The voltage multiplying circuit of claim 3, wherein the first voltage, the first capacitor and the second voltage form a conductive path; the fourth voltage, the second capacitor and the third voltage form a conductive path; and
    the second voltage, the third capacitor and the fourth voltage form a conductive path, in a third mode.

5. The voltage multiplying circuit of claim 4, wherein the first voltage, the first capacitor and the fourth voltage form a conductive path; the second voltage, the second capacitor and the fourth voltage form a conductive path; and the fourth voltage, the third capacitor and the third voltage form a conductive path, in a fourth mode.

6. The voltage multiplying circuit of claim 1, wherein the first voltage, the first capacitor and the fourth voltage form a conductive path, the fourth voltage, the second capacitor and the third voltage form a conductive path, and the second voltage, the third capacitor and the fourth voltage form a conductive path, in a second mode.

7. The voltage multiplying circuit of claim 1, wherein the first voltage, the first capacitor and the second voltage form a conductive path; the fourth voltage, the second capacitor and the third voltage form a conductive path; and the second voltage, the third capacitor and the fourth voltage form a conductive path, in a third mode.

8. The voltage multiplying circuit of claim 1, wherein the first voltage, the first capacitor and the fourth voltage form a conductive path; the second voltage, the second capacitor and the fourth voltage form a conductive path; and the fourth voltage, the third capacitor and the third voltage form a conductive path, in a fourth mode.

9. The voltage multiplying circuit of claim 1, wherein the second voltage is a positive integer multiple of the first voltage.

10. The voltage multiplying circuit of claim 1, wherein the third voltage is a negative integer multiple of the first voltage.

11. The voltage multiplying circuit of claim 1, wherein second voltage is twice of the first voltage.

12. The voltage multiplying circuit of claim 1, wherein third voltage is negative twice of the first voltage.

13. The voltage multiplying circuit of claim 1, wherein fourth voltage is a ground voltage level.

14. A voltage multiplying circuit, comprising:
    a first capacitor, comprising a first terminal and a second terminal, wherein the first terminal of the first capacitor is selectively coupled to a first voltage or a second voltage, and the second terminal of the first capacitor is selectively coupled to the first voltage or a fourth voltage, wherein the second voltage is from a first constant voltage source;

a second capacitor, comprising a first terminal and a second terminal, wherein the first terminal of the second capacitor is selectively coupled to the second voltage or the fourth voltage, and the second terminal of the second capacitor is selectively coupled to a third voltage or the fourth voltage, wherein the third voltage is from a second constant voltage source; and a third capacitor, comprising a first terminal and a second terminal, wherein the first terminal of the third capacitor is selectively coupled to the second voltage or the fourth voltage, and the second terminal of the third capacitor is selectively coupled to the third voltage or the fourth voltage;

wherein the first voltage, the first capacitor and the second voltage form a conductive path; the fourth voltage, the second capacitor and the third voltage form a conductive path; and the second voltage, the third capacitor and the fourth voltage form a conductive path, in a third mode.

15. The voltage multiplying circuit of claim 14, wherein the first voltage, the first capacitor and the fourth voltage form a conductive path; the second voltage, the second capacitor and the fourth voltage form a conductive path; and the fourth voltage, the third capacitor and the third voltage form a conductive path, in a fourth mode.

16. A voltage multiplying circuit, comprising:

a first capacitor, comprising a first terminal and a second terminal, wherein the first terminal of the first capacitor is selectively coupled to a first voltage or a second voltage, and the second terminal of the first capacitor is selectively coupled to the first voltage or a fourth voltage, wherein the second voltage is from a first constant voltage source;

a second capacitor, comprising a first terminal and a second terminal, wherein the first terminal of the second capacitor is selectively coupled to the second voltage or the fourth voltage, and the second terminal of the second capacitor is selectively coupled to a third voltage or the fourth voltage, wherein the third voltage is from a second constant voltage source; and a third capacitor, comprising a first terminal and a second terminal, wherein the first terminal of the third capacitor is selectively coupled to the second voltage or the fourth voltage, and the second terminal of the third capacitor is selectively coupled to the third voltage or the fourth voltage;

wherein the first voltage, the first capacitor and the fourth voltage form a conductive path, the fourth voltage, the second capacitor and the third voltage form a conductive path, and the second voltage, the third capacitor and the fourth voltage form a conductive path, in a second mode.

17. A voltage multiplying circuit, comprising:

a first capacitor, comprising a first terminal and a second terminal, wherein the first terminal of the first capacitor is selectively coupled to a first voltage or a second voltage, and the second terminal of the first capacitor is selectively coupled to the first voltage or a fourth voltage, wherein the second voltage is from a first constant voltage source;

a second capacitor, comprising a first terminal and a second terminal, wherein the first terminal of the second capacitor is selectively coupled to the second voltage or the fourth voltage, and the second terminal of the second capacitor is selectively coupled to a third voltage or the fourth voltage, wherein the third voltage is from a second constant voltage source; and a third capacitor, comprising a first terminal and a second terminal, wherein the first terminal of the third capacitor is selectively coupled to the second voltage or the fourth voltage, and the second terminal of the third capacitor is selectively coupled to the third voltage or the fourth voltage;

wherein the first voltage, the first capacitor and the second voltage form a conductive path; the second voltage, the second capacitor and the fourth voltage form a conductive path; and the fourth voltage, the third capacitor and the third voltage form a conductive path, in a first mode;

wherein the first voltage, the first capacitor and the fourth voltage form a conductive path; the fourth voltage, the second capacitor and the third voltage form a conductive path; and the second voltage, the third capacitor and the fourth voltage form a conductive path, in a second mode;

wherein the first voltage, the first capacitor and the second voltage form a conductive path; the fourth voltage, the second capacitor and the third voltage form a conductive path; and the second voltage, the third capacitor and the fourth voltage form a conductive path, in a third mode.

18. The voltage multiplying circuit of claim 17, wherein the first voltage, the first capacitor and the fourth voltage form a conductive path; the second voltage, the second capacitor and the fourth voltage form a conductive path; and the fourth voltage, the third capacitor and the third voltage form a conductive path, in a fourth mode.

* * * * *